Dec. 31, 1929.  D. PERRIER  1,742,095
CENTRIFUGAL SEPARATOR
Filed Jan. 23, 1928
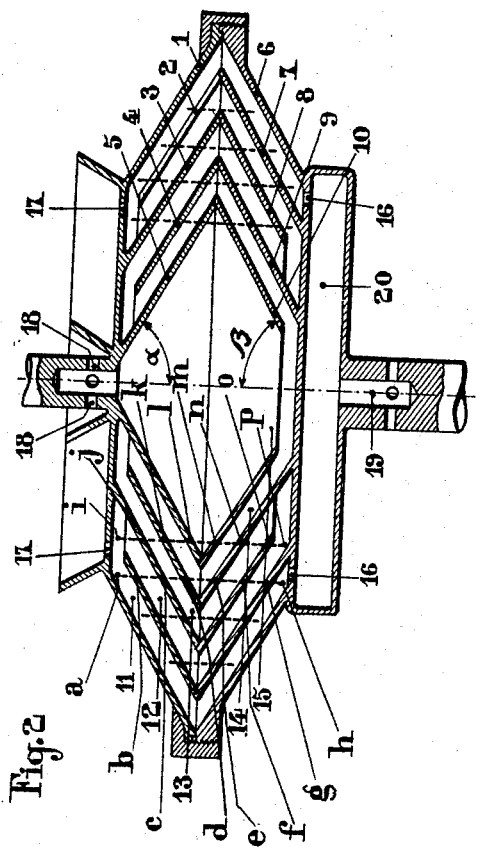
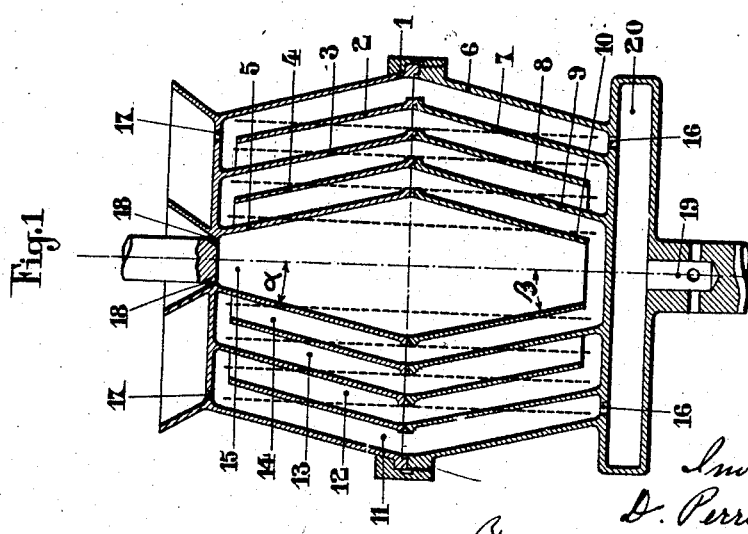

Patented Dec. 31, 1929

1,742,095

UNITED STATES PATENT OFFICE

DANIEL PERRIER, OF UNIEUX, FRANCE, ASSIGNOR OF ONE-HALF TO SOCIÉTÉ ANONYME FRANCAISE DITE: COMPAGNIE INDUSTRIELLE DES MOTEURS A EXPLOSION, C. I. M. E., OF PARIS, FRANCE

CENTRIFUGAL SEPARATOR

Application filed January 23, 1928, Serial No. 248,945, and in Germany January 22, 1927.

The present invention relates to improvements in the rotary distributors of centrifugal separators, and more particularly to those in which the liquid (or gaseous fluid) treated follows, from the outside to the inside, a path through baffles.

The present invention is characterized by the particular arrangement of concentric ribs which form annular chambers, so that the liquid (or gaseous fluid) to be treated is subjected during its path through the apparatus, twice, three times or a number of times which may be practically as large as desired, to the same centrifugal forces as that developed in the outer annular chamber.

A modified form of my invention is disclosed and claimed in my copending application for centrifugal separators 319,644 filed November 15, 1928.

Various embodiments of the improved centrifugal separator forming the subject of the invention are illustrated diagrammatically and simply by way of example in the accompanying drawing.

In this drawing:—

Fig. 1 illustrates a first embodiment of a separator according to the invention in which an equal centrifugal force is obtained in two adjacent chambers.

Fig. 2 illustrates another embodiment in which an equal centrifugal force is obtained in four annular chambers.

According to the invention the rotary distributor is formed by a series of concentric ribs 1, 2, 3, 4 and 5 inclined to the general axis of the apparatus at an angle α which varies essentially according to the results to be obtained. These ribs form cone frustums which are assembled by their large bases with other ribs 6, 7, 8, 9 and 10 also inclined to the general axis of the apparatus at an angle β which will generally be equal to the angle α; but this not an essential feature of the invention, and the angles α and β may be different.

The inclined ribs 6, 7, 8, 9 and 10 are assembled with the inclined ribs 1, 2, 3, 4 and 5 by means of interengaging joints which ensure centering, or by any other means. These ribs are then locked upon each other by any known mechanical means.

The inclined ribs 2 and 4 are open at their ends in the neighbourhood of the small bases of the cone frustums so that the annular chambers 11 and 12, 13 and 14 communicate with each other at their upper parts. Similarly, the ribs 8 and 10 are open at their ends located in the neighbourhood of the small bases of the cone frustums so that the annular chambers 12 and 13, and 14 and 15, communicate with each other at their lower parts.

Orifices 16 pierced in the lower wall of the distributor, permit the liquid or the fluid to be treated to enter the outer annular chamber 11. Orifices 17 pierced in the upper wall of the distributor upon a circle concentric with the axis of the apparatus permit the discharge of a heavy liquid (or a heavy gaseous fluid) contained in the liquid or the gaseous fluid to be treated and which it is desired to remove from the liquid or the gaseous fluid to be obtained finally.

If the liquid or the gaseous fluid to be treated contains no other liquid or gaseous element which it is desired to remove these orifices 17 will be closed. Their arrangement may, moreover, be different from that shown in Fig. 3. In this case they are pierced upon the inclined rib 1 in the neighbourhood of the larger base of the cone frustum, that is to say in the zone in which the centrifugal force is a maximum.

Other orifices 18 are pierced either in the upper wall of the distributor near its central part in the interior of the central chamber 15 or in the axis of the apparatus for discharging the least dense liquid (or gaseous fluid) to be collected in the last place.

The operation of the apparatus is then as follows:—

The liquid or the gaseous fluid to be treated enters through a duct 19 and penetrates into a distributing chamber 20 in which it undergoes a first separation, the most dense solid elements being deposited upon the outer wall of this chamber.

The liquid (or gaseous fluid) then enters the chamber 11 through the orifices 16. A separation by order of density is produced in this chamber. The solid elements which are the heaviest become deposited in the part of the chamber where the centrifugal force is maximum, that is to say, in the zone near the large assembly base of the ribs 6 and 1, the heavy liquid elements (or gaseous) remaining along the inner wall of the rib 1 in order to pass out through the orifices 17.

The remainder of the liquid (or of the gaseous fluid) then enters the chamber 12 in which it undergoes a new separation, and so on in the chambers 13 and 14. It then enters the chamber 15 in which it may again undergo a last separation. It is then collected through the orifices 18.

As will be seen, the liquid to be treated is subjected in its passage through the rotary distributor to an equal centrifugal force in four different annular chambers (cases shown in Figs. 2 and 3). In the zones $ab$ and $gh$ of the chamber 11; $bc$ and $fg$ of the chamber 12; $cd$ and $ef$ of the chamber 13; $de$ of the chamber 14. Similarly, an equal centrifugal force is obtained in the zones $ij$ and $op$ of the chamber 12, $jh$ and $no$ of the chamber 13, $kl$ and $mn$ of the chamber 14, $lm$ of the central chamber 15.

The rotary distributor shown in the accompanying drawing with five concentric ribs may also be constructed according to the invention with any number of ribs.

What I claim is:—

1. In a centrifugal separator, a rotary distributor, comprising a casing, upper and lower, concentrically arranged assemblages of baffles of frusto-conical form within said casing, the corresponding baffles of the two assemblages being connected to each other at their major ends, relatively adjacent baffles defining, between them, circulation chambers concentrically arranged and concentric to the axis of rotation of the distributor, the said baffles being arranged, alternately with respect to one another, to establish communication between said chambers, means for admitting the fluid to be separated into the casing at one point for delivery into the outermost one of said chambers, and means for conducting the refined fluid from the innermost chamber at another point.

2. In a centrifugal separator, a rotary distributor comprising a casing, upper and lower, concentrically arranged assemblages of baffles of frusto-conical form within said casing, the corresponding baffles of the two assemblages being connected to each other at their major ends, and tapering in opposite directions, relatively adjacent baffles defining, between them, circulation chambers concentrically arranged and concentric to the axis of rotation of the distributor, alternate ones of the upper and lower baffles being arranged with their major ends spaced from the adjacent heads of the casing whereby to provide for circulation of fluid between the chambers defined by the baffles, means for admitting the fluid to be separated, into the casing at one point for delivery into the outermost one of said chambers, and means for conducting the refined fluid from the innermost chamber at another point.

3. In a centrifugal separator, a rotary distributor comprising a casing, a distributing and separating chamber at the bottom of the casing having an inlet for the fluid to be treated, upper and lower, concentrically arranged, assemblages of baffles of frusto-conical form within said casing, the corresponding baffles of the two assemblages being connected to each other at their major ends, relatively adjacent baffles defining, between them, circulation chambers concentrically arranged and concentric to the axis of rotation of the distributor, the said baffles being arranged, alternately with respect to one another, to establish communication between said chambers, the said distributing and separating chamber at the bottom of the baffle having a passageway establishing communication between its interior and the outermost one of the concentric chambers whereby to admit, into said outermost concentric chamber, the fluid to be separated, and means at the top of the casing for conducting, from the casing, the refined fluid from the innermost chamber.

4. In a centrifugal separator, a rotary distributor comprising a casing having oppositely tapering frusto-conical upper and lower circumferential walls, constituting upper and lower casing sections, a distributing and separating chamber at the lower minor end of the lower section of the casing, the said upper section of the casing having a closed top, upper and lower, concentrically arranged, assemblages of baffles of frusto-conical form arranged respectively within the upper and lower sections of the casing, the corresponding baffles of the two assemblages being united to each other at their major ends, relatively adjacent ones of the baffles defining, between them, circulation chambers, concentrically arranged and concentric to the axis of rotation of the distributor, the baffles being arranged, alternately with respect to one another, whereby to establish communication between adjacent chambers, the distributing and separating chamber having, at the central portion of its bottom, an inlet for the fluid to be treated and provided in its top wall with openings for the delivery of the lighter content of the fluid to the outermost one of the circulation chambers, and an outlet from the central portion of the top of the upper section of the casing for the delivery of the refined fluid.

5. In a centrifugal separator, a rotary distributor comprising a casing having oppositely tapering frusto-conical upper and lower circumferential walls, constituting upper and lower casing sections, a distributing and separating chamber at the lower minor end of the lower section of the casing, the upper minor end of the upper casing section having an upwardly and outwardly flared extension, the said upper section of the casing having a closed top, upper and lower, concentrically arranged, assemblages of baffles of frusto-conical form arranged respectively within the upper and lower sections of the casing, the corresponding baffles of the two assemblages being united to each other at their major ends, relatively adjacent ones of the baffles defining, between them, circulation chambers, concentrically arranged and concentric to the axis of rotation of the distributor, the baffles being arranged alternately with respect to one another, whereby to establish communication between adjacent chambers, the distributing and separating chamber, having at the central portion of its bottom, an inlet for the fluid to be treated and provided in its top wall with openings for the delivery of the lighter content of the fluid to the outermost one of the circulation chambers, the top of the upper section of the casing having a substantially centrally located delivery opening for the refined fluid into the space surrounded by the outwardly flared extension of the minor end of the upper casing section, and the outermost chamber being in communicaton also with said face substantially at the juncture of the extension with the said upper section of the casing.

6. In a centrifugal separator, a rotary distributor comprising a casing having oppositely tapering frusto-conical upper and lower circumferential walls, constituting upper and lower casing sections, a distributing and separating chamber at the lower minor end of the lower section of the casing, the said upper section of the casing having a closed top and an upwardly and outwardly flared extension extending circumferentially of said top, upper and lower concentrically arranged assemblages of baffles of frusto-conical form arranged respectively within the upper and lower sections of the casing, the corresponding baffles of the two assemblages, with the exception of the outermost one of the upper baffles, being united to each other at their major ends, the outermost baffle of the upper assemblage being united at its major end to the circumferential wall of the upper casing section and at its upper end spaced from the upper end of said wall, whereby to provide a chamber between the said outermost baffle of the upper assemblage and the said upper casing wall, the said outermost baffle of the upper assemblage having openings near the bottom for the passage of the lighter contents of the fluid, the corresponding baffles of the two assemblages, being united to each other, with the exception of the outermost baffle of the upper assemblage, at their major ends, relatively adjacent ones of the baffles defining, between them, circulation chambers concentrically arranged and concentric to the axis of rotation of the distributor, the baffles being arranged alternately with respect to one another, whereby to establish communication between said chambers, the distributing and separating chamber having, at the central portion of its bottom, an inlet for the fluid to be treated and provided in its top wall with openings for the delivery of the lighter contents of the fluid to the outermost one of the circulation chambers.

In testimony whereof I have signed my name to this specification.

DANIEL PERRIER.